United States Patent [19]
Iwata et al.

[11] Patent Number: 5,858,472
[45] Date of Patent: Jan. 12, 1999

[54] METHOD OF IMPROVING THE ELECTRICAL CONDUCTIVITY OF A MOLDING ARTICLE OF RESIN, METHOD OF COATING A MOLDING ARTICLE OF RESIN, AND COATING COMPOSITION

[75] Inventors: Akinori Iwata; Seigo Miyazoe; Tetsuo Shiraiwa, all of Osaka, Japan

[73] Assignees: Nippon Paint Co., Ltd., Osaka; Dai-Ichi Kogyo Seiyaku Co., Ltd., Kyoto, both of Japan

[21] Appl. No.: 717,736

[22] Filed: Sep. 20, 1996

[30] Foreign Application Priority Data

Sep. 25, 1995 [JP] Japan .................................. 7-245949
Sep. 25, 1995 [JP] Japan .................................. 7-245950

[51] Int. Cl.$^6$ .................................................. B05D 3/06
[52] U.S. Cl. ......................... 427/536; 427/539; 427/540
[58] Field of Search .................. 427/536, 539, 427/540, 491

[56] References Cited

U.S. PATENT DOCUMENTS

| | | | |
|---|---|---|---|
| 4,395,434 | 7/1983 | Imada et al. | 427/536 |
| 4,468,412 | 8/1984 | Fujii et al. | 427/536 |
| 5,038,036 | 8/1991 | Kouguchi et al. | 250/324 |
| 5,186,974 | 2/1993 | Gribbin et al. | 427/536 |
| 5,371,649 | 12/1994 | Iwata et al. | 361/225 |
| 5,571,472 | 11/1996 | Shiraiwa | 264/439 |
| 5,599,591 | 2/1997 | Shiraiwa | 427/458 |

FOREIGN PATENT DOCUMENTS

| | | |
|---|---|---|
| 3026317 | 2/1981 | Germany . |
| 57-021433 | 2/1982 | Japan . |
| 6-000920 | 1/1994 | Japan . |
| 07173308A | 7/1995 | Japan . |

OTHER PUBLICATIONS

Masuda et al, IEEE Transactions on Industry Applications, 30(2), Mar./Apr. 1994, pp. 377–380.
Tsutsui et al, J. Coating Technology, 61(776), Sep. 1989, pp. 65–72.

*Primary Examiner*—Erma Cameron
*Attorney, Agent, or Firm*—Jordan and Hamburg

[57] ABSTRACT

The invention provides a method of improving the electrical conductivity of a resin article and a method of coating the article, with high productivity and. without using an inorganic conductive substance-containing primer. The technology comprises coating the substrate with a coating composition essentially consisting of a film-forming component, a nitrogen-containing compound of general formula (1), and a solvent and subjecting the coated surface to corona discharge treatment. The resultant film with improved electrical conductivity is then electrostatically coated.

$$R^1 — Y \qquad (1)$$

wherein $R^1$ represents an alkyl or alkenyl group of 5–21 carbon atoms; Y represents

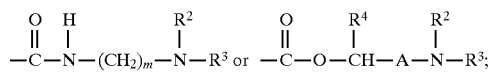

$R^2$ and $R^3$ may be the same or different and each represents an alkyl group of 1–4 carbon atoms; m represents 2–3; $R^4$ represents —H or —$CH_3$; A represents

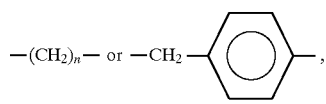

where n represents 1–5.

8 Claims, 2 Drawing Sheets

METHOD OF IMPROVING THE ELECTRICAL CONDUCTIVITY OF A MOLDING ARTICLE OF RESIN, METHOD OF COATING A MOLDING ARTICLE OF RESIN, AND COATING COMPOSITION

BACKGROUND OF THE INVENTION

The present invention relates to a method of improving the electrical conductivity of a molding article of resin, a method of coating a molding article of resin, and a coating composition.

The conventional method of coating a molding article of resin, for example, comprises coating an electrically conductive primer containing an inorganic conductive substance, e.g. conductive carbon black, graphite, or the like, on the surface of a polypropylene article to impart electrical conductivity to said surface and then carrying out electrostatic coating as described in JP-A-06165966.

However, as pointed out in JP-A-06165966, an inorganic conductive substance such as carbon black or graphite must be added in a substantial amount in order that it may be evenly and thoroughly distributed in the surface of the polypropylene article. Therefore, the technology has drawbacks in terms of the dispersion stability of the electrically conductive substance and the cost of production.

Recently disclosed is a method which comprises kneading a nitrogen-containing compound into the molding resin, molding the resultant composition, and subjecting the surface of the molding to low pressure plasma treatment (JP-A-07173308).

However, because the plasma treatment must be a batch operation for low pressure, the method is not adaptable to continuous production and is poor in commercial productivity.

SUMMARY OF THE INVENTION

The present invention has for its object to overcome the above-mentioned disadvantages of the prior art and provide a method of improving the electrical conductivity of a molding article of resin and a method of coating a molding article of resin with good productivity and without a primer containing an inorganic electrically conductive substance, as well as a coating composition for use in carrying said methods into practice.

The inventors of the present invention discovered that by coating a primer containing a specific nitrogen-containing compound on the surface of a molding article of resin and subjecting the treated surface to corona discharge treatment, the electrical conductivity of the surface can be improved to be suitable for electrostatic coating, thus overcoming the above disadvantages.

The present invention is directed, in a first aspect, to a method of improving the electrical conductivity of a molding article of resin through enhancement of surface conductivity which comprises a first step (step 1) of coating a molding article of resin with a coating composition essentially consisting of a film-forming component, a nitrogen-containing compound of general formula (1), and a solvent and a second step (step 2) of subjecting the coated surface to corona discharge treatment. The present invention is directed, in a second aspect, to a method of coating a molding article of resin which comprises said steps 1 and 2 and a third step (step 3) of carrying out electrostatic coating on the corona discharge-treated surface obtained in said step 2. In a third aspect, the present invention is further directed to a coating composition comprising a film-forming component, a nitrogen-containing compound of general formula (1), and a solvent, which finds application in the above-mentioned methods.

wherein $R^1$ represents an alkyl or alkenyl group of 5–21 carbon atoms; Y represents

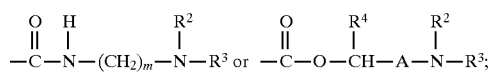

$R^2$ and $R^3$ may be the same or different and each represents an alkyl group of 1–4 carbon atoms; m represents 2–3; $R^4$ represents —H or —$CH_3$; A represents

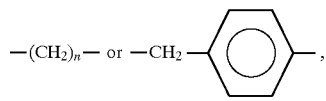

where n represents 1–5.

It is thought that in the accordance with methods of the present invention, owing to the corona discharge treatment, the presence of the nitrogen-containing compound of general formula (1) in a surface of the coating increases and the nitrogen-containing compound is partly quaternized. It is anticipated that these matters make to decrease the surface resistivity of the coating. So it is possible to get a molding article of resin improved in electrical conductivity. Further, together with a surface modifying effect of corona discharge, it is able to carry on electrostatic coating with high coating efficiency.

Furthermore, because the corona discharge treatment is carried out at atmospheric pressure, continuous in-line production can be implemented, thus contributing to productivity.

The present invention is particularly useful for the coating of materials which are intrinsically not suitable for electrostatic coating, such as polypropylene bumpers.

DETAILED DESCRIPTION OF THE PREFERRED EMBODIMENTS

Figure 1:
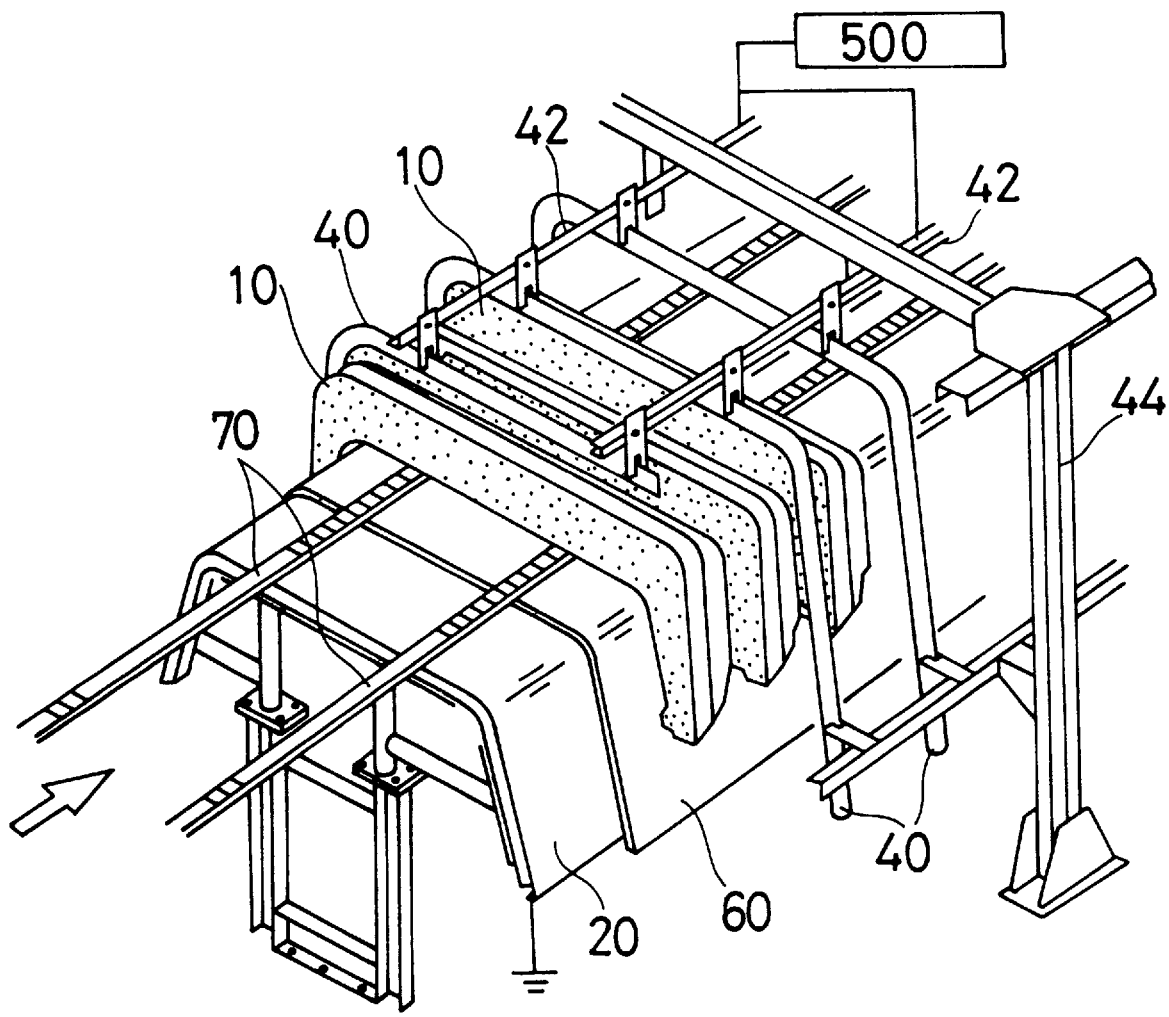
FIG. 1 is an overall perspective view of the corona discharge equipment used in one preferred embodiment of the present invention and FIG. 2 is a diagram showing the electric circuitry of the high-voltage pulse generating unit of the above equipment.

Referring to general formula (1), $R^1$ represents an alkyl or alkenyl group of 5–21 carbon atoms, preferably a $C_{7-17}$ alkyl or alkenyl group, and for still better results, a $C_{9-15}$ alkyl or alkenyl group.

The nitrogen-containing compound of general formula (1) includes a variety of amidoamines such as N,N-dimethylaminopropylhexanamide, N,N-diethylaminopropylhexanamide, N,N-diethylaminoethylhexanamide, N,N-dimethylaminopropyloctanamide, N,N-diethylaminopropyloctanamide, N,N-diethylaminoethyloctanamide, N,N-dibutylaminopropyloctanamide, N,N-dibutylaminoethyloctanamide, N,N-dimethylaminopropyldecanamide, N,N- dimethylaminoethyldecanamide, N,N-diethylaminopropyldecanamide, N,N-diethylaminoethyldecanamide, N,N-dibutylaminopropyldecanamide, N,N-dimethylaminopropyldodecanamide, N,N-dimethylaminoethyldodecanamide, N,N-diethylaminopropyldodecanamide, N,N-diethylaminoethyldodecanamide, N,N-dibutylaminopropyldodecanamide, N,N-dibutylaminoethyldodecanamide, N,N-dimethylaminopropyltetradecanamide, N,N-dimethylaminoethyltetradecanamide, N,N-diethylaminopropyltetradecanamide, N,N-diethylaminoethyltetradecanamide, N,N-dibutylaminopropyltetradecanamide, N,N-dibutylaminoethyltetradecanamide, N,N-dimethylaminopropylhexadecanamide, N,N-diethylaminopropylhexadecanamide, N,N-dimethylaminoethylhexadecanamide, N,N-diethylaminoethylhexadecanamide, N,N-dibutylaminopropylhexadecanamide, N,N-dibutylaminoethylhexadecanamide, N,N-dimethylaminopropyl-9-octadecenamide, N,N-dimethylaminopropyloctadecanamide, N,N-dimethylaminoethyloctadecanamide, N,N-diethylaminopropyloctadecanamide, N,N-diethylaminoethyloctadecanamide, N,N-dibutylaminopropyloctadecanamide, N,N-dibutylaminoethyloctadecanamide, etc.; and fatty acid esters such as 2-dimethylaminoethyl hexanoate, 3-dimethylamino-1-propyl hexanoate, 1-dimethylamino-2-propyl hexanoate, 2-dimethylaminoethyl octanoate, 2-diethylaminoethyl octanoate, 3-dimethylamino-1-propyl octanoate, 1-diethylamino-2-propyl octanoate, 2-dimethylaminoethyl decanoate, 2-dibutylaminoethyl decanoate, 3-diethylamino-1-propyl decanoate, 1-dibutylamino-2-propyl decanoate, 2-dimethylaminoethylundecylate, 3-dimethylamino-1-propyl undecylate, 1-dimethylamino-2-propyl undecylate, 6-dimethylamino-1-hexyl undecylate, 2-dimethylaminoethyl dodecanoate, 2-diethylaminoethyl dodecanoate, 2-dibutylaminoethyl dodecanoate, 3-dimethylamino-1-propyl dodecanoate, 1-dimethylamino-2-propyl dodecanoate, 4-dimethylaminophenethyl dodecanoate, 2-dimethylaminoethyl tetradecanoate, 2-diethylaminoethyl tetradecanoate, 3-diethylamino-1-propyl tetradecanoate, 1-dimethylamino-2-propyl tetradecanoate, 2-dimethylaminoethyl pentadecanoate, 3-dimethylamino-1-propyl pentadecanoate, 1-dimethylamino-2-propyl pentadecanoate, 2-dimethylaminoethyl hexadecanoate, 2-dibutylaminoethyl hexadecanoate, 3-dimethylamino-1-propyl hexadecanoate, 1-dimethylamino-2-propyl hexadecanoate, 4-dimethylamino-1-butyl hexadecanoate, 1-dimethylaminoethyl octadecanoate, 2-diethylaminoethyl octadecanoate, 3-dimethylamino-1-propyl octadecanoate, 1-dimethylamino-2-propyl octadecanoate, 2-diethylaminoethyl 9-octadecenoate, 3-dibutylamino-1-propyl 9-octadecenoate, 2-dimethylaminoethyl docosanoate, 3-dimethylamino-1-propyl docosanoate, 1-dimethylamino-2-propyl docosanoate, etc.

The amidoamines mentioned above can be synthesized by reacting aliphatic monocarboxylic acids of 6–22 carbon atoms with N,N-dialkylaminoalkylamines such as N,N-dimethylaminopropylamine, N,N-dimethylaminoethylamine, N,N-diethylaminopropylamine, N,N-diethylaminoethylamine, N,N-dibutylaminopropylamine, N,N-dibutylaminoethylamine, etc. This reaction can be carried out by the conventional amidation procedure. Thus, this reaction proceeds under heating at 140°–200° C. The progress of the reaction can be monitored by measuring the total amine value, tertiary amine value, and an acid value.

The fatty acid esters mentioned above can be synthesized by reacting aliphatic monocarboxylic acids of 6–22 carbon atoms with N,N-dialkylaminoalcohols such as 2-dimethylaminoethanol, 2-diethylaminoethanol, 2-dibutylaminoethanol, 3-dimethylamino-1-propanol, 3-diethylamino-1-propanol, 3-dibutylamino-1-propanol, 1-dimethylamino-2-propanol, 1-diethylamino-2-propanol, 1-dibutylamino-2-propanol, 4-dimethylamino-1-butanol, 6-dimethylamino-1-hexanol, 4-dimethylaminophenethyl alcohol, etc. This reaction can be carried out by the conventional esterification method. Thus, this reaction proceeds under heating at 140°–230° C. The progress of the reaction can be monitored by determining an acid value.

The coating composition of the present invention contains a film-forming component. This film-forming component consists of a basic resin and a curing agent. However, when the coating composition contains a thermoplastic resin or a self-crosslinking resin as the basic resin and does not contain a curing agent, the film-forming component is the very basic resin.

The basic resin that can be used includes a variety of resins which are used in the conventional coatings, such as chlorinated polyolefin resin, acrylic acid resin, polyester resin, alkyd resin, epoxy resin, urethane resin, polyacrylate resin, etc. Particularly preferred are chlorinated polyolefins which are generally used in primers for bumpers.

The curing agent that can be used includes polyfunctional compounds or resins, such as polyisocyanates, polyamines, melamine, polybasic acids, polyepoxides, etc. Of course, when the basic resin is a self-crosslinking resin, the basic resin itself contains a crosslinkable component as it is the case with polyacrylates, for instance.

The coating composition of the present invention further contains a solvent. The kind of solvent is not limited. Thus, for example, the standard organic solvents or water can be employed. The proportion of the solvent in the coating composition is not so critical but is preferably selected from the range of 50–1,000 parts by weight to each 100 parts by weight of the film-forming component. If the proportion of the solvent is below the above-mentioned limit of 50 parts by weight, workability is sacrificed. On the other hand, if the upper limit of 1,000 parts by weight is exceeded, the solid fraction will be undesirably low. In addition to the above components, the coating composition of the present invention can be supplemented with a pigment, a catalyst and/or other additives where necessary. It is generally known that these additional components are used or not used depending on the form and objective of application. There is virtually no limitation on the kinds of said additives.

The proportion of the nitrogen-containing compound of general formula (1) based on 100 parts by weight of the film-forming component is preferably 0.01–10 parts by weight, more preferably 0.05–7 parts by weight, and for still better results, 0.1–5 parts by weight. If the proportion is less than 0.01 part by weight, the coating layer on the resin article obtained will not have sufficient electrical conductivity. Any proportion exceeding 10 parts by weight would be further contributory to electrical conductivity but the resultant deterioration of physical properties of the coating and bleeding on the surface would virtually cancel the benefit.

There is no limitation on the technology that can be used for the production of the coating composition of the invention. Generally speaking, the composition can be produced by adding a nitrogen-containing compound of general formula (1), either as it is or as dissolved or dispersed in a solvent, in a suitable amount to a coating composition (hereinafter referred to as stock coating) which has no antistatic properties. Of course, the coating composition can also be produced by adding said nitrogen-containing compound of general formula (1) simultaneously with the addition of said basic resin, curing agent, and other additives.

Coating with the coating composition containing the nitrogen-containing compound of general formula (1) can be carried out by a known coating technique which may for example be spray coating, brush coating, dip coating, roll coating or casting. For the coating of automotive parts, spray coating and dip coating are preferred.

For the coating of molding articles of resin, the coating composition can be applied in any of the conventional application forms such as room temperature-curing, lacquer, heat-curing, organic solvent-borne, and water-borne coatings. Depending on cases, the substrate article of resin may be pretreated before coating so as to improve the adhesion of the coating. The pretreatment that can be applied includes a variety of known pretreatments such as aqueous rinse, solvent rinse, flame treatment, corona discharge treatment, and low pressure plasma treatment.

The coating thickness and drying conditions for molding articles of resin can be similar to those applicable to the stock coating. Taking a primer containing a chlorinated polyolefin and not containing a curing agent as an example, the coating thickness may be 5–15 $\mu$m and the drying conditions may be about 10 minutes at 50°–80° C. The same conditions apply to the wet-on-wet coating system in which the top coat is applied to the primer coat while the latter is still wet. With the coating composition using an acrylic or polyester resin as the basic resin and a polyisocyanate as the curing agent, the coating thickness may be 20–40 $\mu$m and the drying conditions may be about 20–40 minutes at 80°–90° C. As to the coating composition containing an acrylic or polyester resin as the basic resin and melamine as the curing agent, the coating thickness may be 20–40 $\mu$m and the drying conditions may be about 20–40 minutes at 100°–120° C.

The molding article of resin that can be used as the substrate includes articles of polyolefin resin [e.g. polyethylene, polypropylene, poly(ethylene-copropylene) rubber-containing polypropylene, etc.], ABS resin, acrylic resin, polyamide resin, poly(vinyl chloride) resin, polycarbonate resin, polyacetal resin, polystyrene resin, phenolic resin, etc., all of which have high surface resistivity. Furthermore, the molding article may be a metal, ceramic, or wooden article coated with any of said resin materials. Particularly preferred resins are polyolefin resins which are generally used for the manufacture of automotive parts.

It is also possible to employ a molding article of resin produced by a process which comprises kneading an antistatic agent and other additives into the abovementioned resin, molding the resulting compound, and optionally subjecting it to a surface treatment such as corona discharge treatment, low pressure plasma treatment, flame treatment or the like so as to adjust its surface resistivity to less than $10^{13}$ $\Omega$.

When a molding article of resin with a surface resistivity of less than $10^{13}$ $\Omega$ is employed, the coating with the coating composition containing a nitrogen-containing compound of general formula (1) in step 1 may be carried out by the electrostatic coating method.

The molding article of resin may be any of three-dimensional articles and two-dimensional articles such as film and sheet.

The molding article of resin includes but is not limited to automotive parts and electrical appliance housings.

Among the above-mentioned automotive parts are side malls, bumpers, and mudguards etc.

The corona discharge treatment is carried out in such a manner that the corona produced by applying a high voltage between two electrical conductors at atmospheric pressure is contacted with the surface of the substrate (a molding article of resin). The conditions of this treatment need not be critically controlled only if a corona discharge takes place. Thus, for example, the corona discharge treatment can be carried out at an application voltage of about 10–300 KV for 1–600 seconds.

Particularly when a large-sized article such as an automotive bumper is subjected to corona discharge treatment, a corona discharge equipment utilizing a high-voltage pulse typically as shown in FIG. 1 can be employed. Since this equipment utilizes the high-voltage pulse circuit shown in FIG. 2 sparking is seldom induced and the distance between electrodes can be increased to accommodate large-sized parts.

The above corona discharge equipment is now described in detail.

FIG. 1 shows an external view of the corona discharge equipment. As the substrate article of resin 10, a generally U-shaped automotive bumper is used and the surface of this article is subjected to corona discharge treatment. A plurality of units of said article of resin 10 are caused to travel one after another on a roller conveyer 70 installed in the manner of a railroad track. The roller conveyer 70, made of insulating resin or the like, is disposed on a counter electrode 20. The counter electrode 20 comprises a plate member having a U-like cross-sectional configuration complementary to the bent portions of the molding article of resin 10, with its upper surface being covered with a dielectric cladding 60.

Arranged over the track for the molding article of resin 10, a plurality of discharge electrodes 40 each comprising a narrow strip bended to have a U-like configuration with fixed spacings therebetween. The lower edge of each discharge electrode 40 is configured to be generally complementary to the top edge of the molding article of resin 10 and is substantially parallel to the surface of the counter electrode 20 with a clearance of about a fraction of one meter between them. The top of the discharge electrode 40 is supported by connecting metal strips 42 and electrically connected thereto. The discharge electrode 40 is removably secured to the connecting strip metals 42 by bolt means so that the pitch of discharge electrodes 40 can be changed as necessary. Both ends of the connecting metal strips 42 are secured to a frame 44. In addition, a high-voltage pulse generator 500 is connected to said connecting metal strips 42 via high-tension cables.

Thus, as the molding article of resin 10 is placed on the roller conveyer 70 disposed over the counter electrode 20, it is transported under the discharge electrodes 40. As, in this condition, a high-voltage pulse is applied between the discharge electrode 40 and the counter electrode 20, a corona discharge takes place to treat the surface of the molding article of resin 10.

Figure 2:
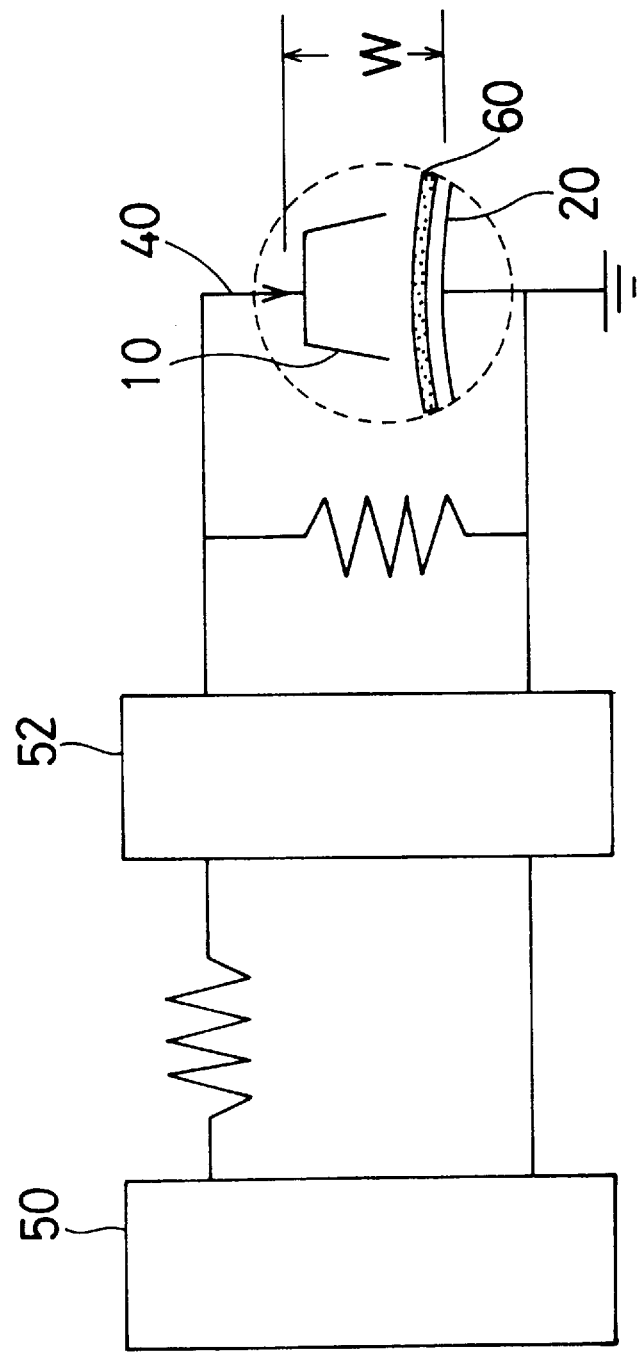

FIG. 2 shows the circuitry of the above corona discharge equipment. As described above, the resin article 10 is set on the counter electrode 20 through the dielectric cladding 60, with the discharge electrodes 40 being disposed overhead. The clearance W between the discharge electrode 40 and the counter electrode 20 is the electrode gap. The circuit connected to the discharge electrode 40 and counter electrode 20 includes a pulse generator 52 and a high-voltage source 50. The high-voltage source 50 may be any of known high-voltage sources which are capable of generating a necessary high voltage current from a low-voltage direct current source. The circuit constant and other conditions of the pulse generator 52 being set to the proper values, a high-voltage pulse showing the desired characteristics can be applied between the discharge electrode 40 and the counter electrode 20.

The high-voltage pulse for this corona discharge treatment has a pulse width of not less than 1 $\mu$sec, an average electric field intensity (expressed by applied voltage (wave height) value/distance between discharge and counter electrodes) of 4–20 KV/cm, and a pulse frequency of not less than 10 pps, preferably 10–300 pps, as taught in JP-A-05339397. The treatment time may be 1–600 seconds.

Where necessary, after the above-mentioned step 2 the work may be further coated with a coating composition containing a nitrogen-containing compound of general formula (1) and the resulting film be subjected to corona discharge treatment. This coating can be carried out by the electrostatic coating method, if desired.

The electrostatic coating in step 3 comprises spraying and depositing a coating material having electrostatic charges on the corona discharge-treated coating layer obtained by step 2. This coating can be carried out by any known method, for example by means of an electric centrifugal air or airless atomization coating machine. The application voltage is about −30 KV to −120 KV. As the coating material for use in this electrostatic coating procedure may be any of the conventional electrostatic coating materials such as the urethane, acrylic, alkyd, and melamine type coatings.

In accordance with the present invention, molding articles of resin with greatly improved electrical conductivity can be manufactured using resins of low electrical conductivity with high productivity. Moreover, the present invention enables electrostatic coating with high coating efficiency and production of molding articles of resin having an attractive appearance. Furthermore, as an unexpected benefit, the impact resistance of the coating is improved. The present invention, therefore, is particularly useful for the production of automotive parts such as bumpers.

The following examples are intended to describe the present invention in further detail and should by no means be construed as defining the scope of the invention.

EXAMPLES 1–23

(Steps 1 and 2)

Coating compositions each containing a nitrogen-containing compound of general formula (1) in a defined proportion were prepared according to the recipes shown in Table 1 and each coating composition was coated on a molding article of polypropylene resin (Mitsui Petrochemical Industries, Ltd., M-4800; 150 mm×60 mm×3 mm) which had been rinsed and degreased with isopropyl alcohol beforehand. After drying, the surface of the coated article of resin was subjected to corona discharge treatment to prepare a testpiece. Immediately then, the surface resistivity of the testpiece was measured and the coated condition was evaluated. In addition, the impact resistance of the coating was determined.

(Step 3)

With the above testpiece grounded, it was electrostatically coated with a melamine coating (Nippon Bee Chemical, R-320) using a coating machine (Ransburg-Gema, $\mu\mu$BEL30$\phi$) at a static voltage of −40 KV, a reciprocation stroke of 400 mm, a spray distance of 300 mm, and a conveyer speed of 2.2 m/min. After 30 minutes of drying at 120° C., the coating thickness, coating efficiency, and adhesion were determined.

COMPARATIVE EXAMPLES 1–10

The same procedures as described in Examples 1–23 were followed to make evaluations.

The results of Examples 1–23 and Comparative Examples 1–10 are shown in Table 1 and Table 2, respectively. It will be apparent from these tables that the present invention is superior in film properties, electrical conductivity, and coating efficiency. It is also clear that an improved impact resistance of the coating was achieved in Examples 1–23.

TABLE 1

| | Step 1–Step 2 | | | | | | | Step 3 | | | | |
|---|---|---|---|---|---|---|---|---|---|---|---|---|
| | Nitrogen-containing compound of general formula (1) | | | | Surface | | | Coat | Coating | | Adhesion | |
| Example | Species *1 | Level *2 | Stock coating *3 | Corona discharge *4 | resistivity ($\Omega$) *5 | Coat quality *6 | Impact resistance *7 | thickness ($\mu$m) *8 | efficiency (%) *9 | Coat quality *6 | Primary adhesion *10 | Secondary adhesion *11 |
| 1 | A | 3 | T-1 | S-2 | $8.5 \times 10^{11}$ | ○ | ○ | 30 | 75 | ○ | ○ | ○ |
| 2 | B | 3 | T-1 | S-2 | $6.4 \times 10^{11}$ | ○ | ○ | 31 | 76 | ○ | ○ | ○ |
| 3 | C | 3 | T-3 | S-2 | $7.1 \times 10^{11}$ | ○ | ⊚ | 31 | 76 | ○ | ○ | ○ |
| 4 | D | 3 | T-3 | S-2 | $4.0 \times 10^{11}$ | ○ | ⊚ | 32 | 77 | ○ | ○ | ○ |
| 5 | E | 3 | T-3 | S-1 | $4.3 \times 10^{11}$ | ○ | ⊚ | 32 | 77 | ○ | ○ | ○ |
| 6 | F | 3 | T-1 | S-1 | $1.5 \times 10^{11}$ | ○ | ○ | 34 | 78 | ○ | ○ | ○ |
| 7 | F | 3 | T-1 | S-2 | $7.8 \times 10^{10}$ | ○ | ○ | 35 | 82 | ○ | ○ | ○ |
| 8 | F | 3 | T-2 | S-1 | $9.1 \times 10^{10}$ | ○ | ⊚ | 35 | 82 | ○ | ○ | ○ |
| 9 | G | 3 | T-1 | S-2 | $8.9 \times 10^{10}$ | ○ | ○ | 35 | 82 | ○ | ○ | ○ |
| 10 | H | 3 | T-2 | S-2 | $6.0 \times 10^{10}$ | ○ | ⊚ | 36 | 83 | ○ | ○ | ○ |
| 11 | I | 3 | T-2 | S-2 | $7.1 \times 10^{10}$ | ○ | ⊚ | 35 | 82 | ○ | ○ | ○ |

TABLE 1-continued

| | | | | | | | | | | | | |
|---|---|---|---|---|---|---|---|---|---|---|---|---|
| 12 | F | 0.08 | T-1 | S-2 | $8.0 \times 10^{11}$ | ○ | ○ | 30 | 75 | ○ | ○ | ○ |
| 13 | F | 0.5 | T-1 | S-2 | $4.5 \times 10^{11}$ | ○ | ○ | 32 | 77 | ○ | ○ | ○ |
| 14 | F | 5 | T-1 | S-2 | $5.3 \times 10^{10}$ | ○ | ⊙ | 36 | 83 | ○ | ○ | ○ |
| 15 | F | 8 | T-1 | S-2 | $3.4 \times 10^{10}$ | ○ | ⊙ | 36 | 83 | ○ | ○ | ○ |
| 16 | J | 3 | T-1 | S-2 | $9.2 \times 10^{10}$ | ○ | ○ | 35 | 82 | ○ | ○ | ○ |
| 17 | J | 0.5 | T-1 | S-2 | $5.1 \times 10^{11}$ | ○ | ○ | 32 | 77 | ○ | ○ | ○ |
| 18 | J | 8 | T-1 | S-2 | $7.6 \times 10^{10}$ | ○ | ⊙ | 35 | 82 | ○ | ○ | ○ |
| 19 | K | 3 | T-1 | S-2 | $1.0 \times 10^{11}$ | ○ | ⊙ | 34 | 79 | ○ | ○ | ○ |
| 20 | L | 3 | T-1 | S-1 | $1.2 \times 10^{11}$ | ○ | ○ | 34 | 79 | ○ | ○ | ○ |
| 21 | M | 3 | T-1 | S-2 | $3.5 \times 10^{11}$ | ○ | ⊙ | 32 | 77 | ○ | ○ | ○ |
| 22 | N | 3 | T-1 | S-2 | $3.9 \times 10^{11}$ | ○ | ○ | 32 | 77 | ○ | ○ | ○ |
| 23 | O | 3 | T-1 | S-2 | $6.9 \times 10^{11}$ | ○ | ○ | 31 | 76 | ○ | ○ | ○ |

*1 A: N,N-dimethylaminopropylhexanamide
B: N,N-diethylaminopropyloctanamide
C: 2-Diethylaminoethyl octanoate
D: N,N-diethylaminoethyldecanamide
E: 2-Dibutylaminoethyl decanoate
F: N,N-diethylaminopropyldodecanamide
G: 2-Dimethylaminoethyl dodecanoate
H: N,N-dimethylaminopropyldodecanamide
I: 2-Dibutylaminoethyl dodecanoate
J: 3-Diethylamino-1-propyl tetradecanoate
K: N,N-dibutylaminoethylhexadecanamide
L: 4-Dimethylamino-1-butyl hexadecanoate
M: N,N-diethylaminopropyloctadecanamide
N: M/2-diethylaminoethyl 9-octadecenoate = 1/1 (wt/wt)
O: 2-Dimethylaminoethyl docosanoate
*2 The amount in parts by weight based on 100 parts by weight of the film-forming component in the coating composition.
*3 T-1: Primer RB-195 manufactured by Nippon Bee Chemical.
Base resin: chlorinated polyolefin
Curing agent: None
Coating was carried out by the air spray method in a dry thickness of about 10 μm and drying was carried out at 50° C. for 10 minutes.
T-2: Coating R-215 manufactured by Nippon Bee Chemical.
Base resin: polyester-acrylic
Curing agent: a polyisocyanate
Coating was carried out by the air spray method in a dry thickness of about 20 μm and, after a setting time of about 10 minutes, drying was carried out at 80° C. for 30 minutes.
T-3: Coating R-207 manufactured by Nippon Bee Chemical.
Base resin: acrylic
Curing agent: melamine
Coating was carried out by the air spray method in a dry thickness of about 20 μm and, after a setting time of about 10 minutes, drying was carried out at 120° C. for 30 minutes.
*4 S-1: Corona discharge treatment
(Conditions): The coated surface of the resin article was subjected to corona discharge treatment at an application voltage of 30 KV for 20 seconds. The electrode gap was 1 cm. (High-frequency source: Kasuga Denki High-frequency Source HFS-203)
S-2: Corona discharge treatment with a high-voltage pulse
(Conditions): The coated surface of the resin article was subjected to corona discharge treatment at an application voltage of 190 KV for 20 seconds. The electrode gap was 35 cm. (The corona discharge equipment shown in FIG. 1 was used)
*5 The surface resistivity immediately after corona discharge treatment was measured 1 minute after applying a voltage of 500 V using Advantest's ultra-high resistance meter R8340 (relative humidity 65%, atmospheric temperature 20° C.)
*6 The condition of the coating was visually evaluated in terms of roughness, gloss, and coating defect (cratering, hollow, color shading).
○: good
x: no good
*7 Impact resistance: Using a DuPont impact tester, an impact load of 1 kg with a falling ball diameter of ½ inch was applied to the coated surface of the testpiece and the falling distance not causing any abnormality in the coating was determined. The evaluation scale according to the falling distance not causing any abnormality was as follows.
⊙: excellent (>50 cm)
○: good (50 cm)
Δ: practically acceptable (45 cm)
x: poor (<45 cm)
*8 Coating thickness: The coating thickness was visually determined by microscopic observation of the surface of the coated resin article.
*9 Coating efficiency: From the relationship of the difference between the weight before coating and that after coating with the bone-dry weight of the delivered coating, the coating efficiency was calculated by means of the following equation.
Coating efficiency (%) =
(weight of testpiece after coating − weight of testpiece before coating)/Bone-dry weight of delivered coating × 100
*10 Using a single-blade razor, the electrostatically coated surface of the testpiece was cross-hatched at a pitch of 2 mm to provide 100 squares. An adhesive cellophan tape (JIS Z 1552) was firmly applied against the cross-hatched surface and peeled off in a stroke at an angle of 90° to evaluate the peeling resistance.
○: not peeled
x: peeled
*11 The electrostatically coated testpiece was immersed in water at 40° C. for 240 hours and the peeling resistance was evaluated by the same method as *10.
○: not peeled
x: peeled

TABLE 2

| | Nitrogen-containing compound of general formula (1) | | Step 1–Step 2 | | | | | Step 3 | | | | |
|---|---|---|---|---|---|---|---|---|---|---|---|---|
| | | | | | Surface | | | Coat | Coating | | Adhesion | |
| | | | Stock | Corona | resistivity | Coat | Impact | thickness | efficiency | Coat | Primary | Secondary |
| Comparative Example | Species *1 | Level *2 | coating *3 | discharge *4 | (Ω) *5 | quality *6 | resistance *7 | (μm) *8 | (%) *9 | quality *6 | adhesion *10 | adhesion *11 |
| 1 | None | 0 | T-1 | None | $1.5 \times 10^{16}$ | ○ | x | 7 | 23 | ○ | ○ | ○ |
| 2 | None | 0 | T-2 | None | $1.2 \times 10^{16}$ | ○ | Δ | 8 | 25 | ○ | ○ | ○ |
| 3 | None | 0 | T-3 | None | $2.1 \times 10^{16}$ | ○ | Δ | 7 | 23 | ○ | ○ | ○ |
| 4 | None | 0 | T-1 | S-1 | $1.3 \times 10^{16}$ | ○ | x | 8 | 25 | ○ | ○ | ○ |
| 5 | None | 0 | T-1 | S-2 | $1.0 \times 10^{16}$ | ○ | x | 8 | 25 | ○ | ○ | ○ |
| 6 | None | 0 | T-3 | S-2 | $1.8 \times 10^{16}$ | ○ | Δ | 7 | 23 | ○ | ○ | ○ |
| 7 | F | 3 | T-1 | None | $9.3 \times 10^{15}$ | ○ | ○ | 8 | 25 | ○ | ○ | ○ |
| 8 | I | 3 | T-1 | None | $1.0 \times 10^{16}$ | ○ | ○ | 8 | 25 | ○ | ○ | ○ |
| 9 | F | 3 | T-2 | None | $9.5 \times 10^{15}$ | ○ | ○ | 8 | 25 | ○ | ○ | ○ |
| 10 | I | 3 | T-3 | None | $1.1 \times 10^{16}$ | ○ | ○ | 8 | 25 | ○ | ○ | ○ |

*1–*11: Same as defined for Table 1.

EXAMPLES 24–29

(Steps 1 and 2)

Coating compositions each containing a nitrogen-containing compound of general formula (1) in a defined proportion were prepared according to the recipes shown in Table 3. Each of the coating compositions thus prepared was coated on an automotive polypropylene bumper (surface resistivity $1.0 \times 10^{16}$ Ω) and, after drying, the coated surface was subjected to corona discharge treatment. Immediately then, the surface resistivity was measured and the condition of the coating was evaluated. The impact resistance of the coating was also measured.

(Step 3)

With the above polypropylene bumper grounded, electrostatic coating was carried out with a melamine coating (Nippon Bee Chemical, R-320) using a coating machine (Ransburg-Gema, μμBEL30φ) at a static voltage of –40 KV, a reciprocation stroke of 400 mm, a spray distance of 300 mm, and a conveyer speed of 2.2 m/min. and drying was carried out at 120° C. for 30 minutes. The coating thickness, coating efficiency, and adhesion were then determined.

EXAMPLE 30

(Steps 1 and 2)

A coating composition containing a nitrogen-containing compound of general formula (1) in a defined proportion according to the recipe shown in Table 3 and an automotive polypropylene bumper contaning an additive (surface resistivity $5.2 \times 10^{11}$ Ω) was electrostatically coated with the composition. After drying, the coated surface was subjected to corona discharge treatment and immediately then the surface resistivity was measured and the coat condition was evaluated. The impact resistance of the coating was also determined.

The bumper used above was a bumper which had been molded from a polypropylene containing 0.5% of a nitrogen-containing compound of general formula (1) (F) (surface resistivity $3.1 \times 10^{15}$ Ω), rinsed and degreased with isopropyl alcohol, and subjected to corona discharge treatment (S-2).

(Step 3)

The procedure used in Examples 24–29 was repeated.

EXAMPLE 31

(Steps 1 and 2)

A coating composition containing a nitrogen-containing compound of general formula (1) in a defined proportion according to the recipe shown in Table 3 was prepared and an automotive polypropylene bumper containing an additive (surface resistivity $4.5 \times 10^{11}$ Ω) was electrostatically coated with the coating composition, dried, and subjected to corona discharge treatment. Immediately then, the surface resistivity was measured and the condition of the coating was evaluated. The impact resistance of the coating was also determined.

The bumper used above was a bumper which had been molded from a polypropylene containing 0.5% of a nitrogen-containing compound of general formula (1) (I) (surface resistivity $3.1 \times 10^{15}$ Ω) and subjected to corona discharge treatment (S-2).

(Step 3)

The corresponding procedure used in Examples 24–29 was repeated.

COMPARATIVE EXAMPLES 11–14

The procedure described in Examples 24–29 was repeated.

The results of examples 24–31 and Comparative Examples 11–14 are shown in Table 3 and Table 4, respectively. It will be apparent from these tables that in the production of large-sized articles such as automotive bumpers, the corona discharge treatment using a high-voltage pulse is conducive to excellent results in the physical properties and electrical conductivity of the coating and coating efficiency. It is also clear that the impact resistance of the coating is excellent in Examples 24–31.

TABLE 3

| | Nitrogen-containing compound of general formula (1) | | | | Step 1–Step 2 | | | Step 3 | | | | |
| | | | | | Surface | | | | | | Adhesion | |
| | Species | Level | Stock coating | Corona discharge | resistivity (Ω) | Coat quality | Impact resistance | Coat thickness (μm) | Coating efficiency (%) | Coat quality | Primary adhesion | Secondary adhesion |
| Example | *1 | *2 | *3 | *4 | *5 | *6 | *7 | *8 | *9 | *6 | *10 | *11 |
| 24 | F | 0.5 | T-1 | S-2 | $4.6 \times 10^{11}$ | ○ | ○ | 33 | 59 | ○ | ○ | ○ |
| 25 | F | 3 | T-1 | S-2 | $8.1 \times 10^{10}$ | ○ | ○ | 34 | 60 | ○ | ○ | ○ |
| 26 | F | 8 | T-1 | S-2 | $3.1 \times 10^{10}$ | ○ | ⊚ | 35 | 61 | ○ | ○ | ○ |
| 27 | I | 0.5 | T-1 | S-2 | $5.1 \times 10^{11}$ | ○ | ○ | 33 | 59 | ○ | ○ | ○ |
| 28 | I | 3 | T-1 | S-2 | $7.5 \times 10^{10}$ | ○ | ○ | 34 | 60 | ○ | ○ | ○ |
| 29 | I | 8 | T-1 | S-2 | $4.0 \times 10^{10}$ | ○ | ⊚ | 35 | 61 | ○ | ○ | ○ |
| 30 | F | 3 | T-1 | S-2 | $8.2 \times 10^{10}$ | ○ | ○ | 34 | 60 | ○ | ○ | ○ |
| 31 | I | 3 | T-1 | S-2 | $7.9 \times 10^{10}$ | ○ | ○ | 34 | 60 | ○ | ○ | ○ |

*1–*11: Same as defined for Table 1.

TABLE 4

| | Nitrogen-containing compound of general formula (1) | | | | Step 1–Step 2 | | | Step 3 | | | | |
| | | | | | Surface | | | | | | Adhesion | |
| | Species | Level | Stock coating | Corona discharge | resistivity (Ω) | Coat quality | Impact resistance | Coat thickness (μm) | Coating efficiency (%) | Coat quality | Primary adhesion | Secondary adhesion |
| Comparative Example | *1 | *2 | *3 | *4 | *5 | *6 | *7 | *8 | *9 | *6 | *10 | *11 |
| 11 | F | 3 | T-1 | S-1 | —* | — | — | — | — | — | — | — |
| 12 | None | 0 | T-1 | S-2 | $1.0 \times 10^{16}$ | ○ | x | 8 | 25 | ○ | ○ | ○ |
| 13 | F | 3 | T-1 | None | $9.2 \times 10^{15}$ | ○ | ○ | 7 | 23 | ○ | ○ | ○ |
| 14 | I | 3 | T-1 | None | $9.8 \times 10^{15}$ | ○ | ○ | 8 | 25 | ○ | ○ | ○ |

*1–*11: Same as defined for Table 1.
*: Because of the small electrode gap (1 cm), bumpers could not be treated.

What is claimed is:

1. A method of improving the electrical conductivity of a molding article of resin, the improvement comprising the steps of: coating a molding article of resin with a coating composition essentially consisting of a film-forming component, a nitrogen-containing compound of the following general formula (1), and a solvent; and subjecting the resultant coated surface to corona discharge treatment $$R^1—Y \quad (1)$$

wherein $R^1$ represents an alkyl or alkenyl group of 5–21 carbon atoms; Y represents

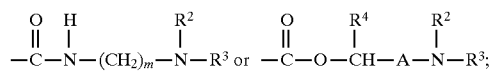

$R^2$ and $R^3$ may be the same or different and each represents an alkyl group of 1–4 carbon atoms; m represents 2–3; $R^4$ represents —H or —CH$_3$; A represents —(CH$_2$)$_n$— or —CH$_2$

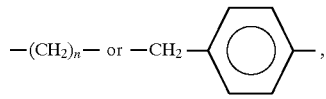

where n represents 1–5.

2. The method of improving the electrical conductivity of a molding article of resin according to claim 1 wherein said coating composition contains said nitrogen-containing compound of general formula (1) in a proportion of 0.01–10 parts by weight based on 100 parts by weight of said film-forming component.

3. The method of improving the electrical conductivity of a molding article of resin according to claim 1 wherein said corona discharge treatment is carried out using a high-voltage pulse.

4. The method of improving the electrical conductivity of a molding article of resin according to claim 1 wherein said molding article of resin is an automotive part.

5. A method of coating a molding article of resin which comprises the steps of: coating a molding article of resin with a coating composition essentially consisting of a film-forming component, a nitrogen-containing compound of the following general formula (1), and a solvent; subjecting the resultant coated surface to corona discharge treatment; and subjecting the corona discharge-treated surface to electrostatic coating.

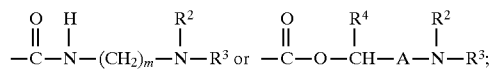

wherein $R^1$ represents an alkyl or alkenyl group of 5–21 carbon atoms; Y represents $$-\overset{O}{\underset{\|}{C}}-\overset{H}{\underset{|}{N}}-(CH_2)_m-\overset{R^2}{\underset{|}{N}}-R^3 \text{ or } -\overset{O}{\underset{\|}{C}}-O-\overset{R^4}{\underset{|}{CH}}-A-\overset{R^2}{\underset{|}{N}}-R^3;$$

$R^2$ and $R^3$ may be the same or different and each represents an alkyl group of 1–4 carbon atoms; m represents 2–3; $R^4$ represents —H or —$CH_3$; A represents

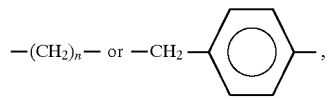

where n represents 1–5.

6. The method of coating a molding article of resin according to claim 5 wherein said coating composition contains said nitrogen-containing compound of general formula (1) in a proportion of 0.01–10 parts by weight based on 100 parts by weight of said film-forming component.

7. The method of coating a molding article of resin according to claim 5 wherein said corona discharge treatment is carried out using a high-voltage pulse.

8. The method of coating a molding article of resin according to claim 5 wherein said molding article of resin is an automotive part.

* * * * *